United States Patent
Ahmadi et al.

(10) Patent No.: US 10,073,648 B2
(45) Date of Patent: *Sep. 11, 2018

(54) REPARTITIONING DATA IN A DISTRIBUTED COMPUTING SYSTEM

(71) Applicant: Google LLC, Mountain View, CA (US)

(72) Inventors: Hossein Ahmadi, Kirkland, WA (US);
Matthew B. Tolton, Seattle, WA (US);
Michael Entin, Redmond, WA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/914,012

(22) Filed: Mar. 7, 2018

(65) Prior Publication Data
US 2018/0196618 A1   Jul. 12, 2018

Related U.S. Application Data

(63) Continuation of application No. 15/235,511, filed on Aug. 12, 2016, now Pat. No. 9,952,798.

(51) Int. Cl.
*G06F 3/06* (2006.01)
*G06F 13/28* (2006.01)
*G06F 17/30* (2006.01)

(52) U.S. Cl.
CPC ............ *G06F 3/0644* (2013.01); *G06F 3/067* (2013.01); *G06F 3/0611* (2013.01); *G06F 3/0631* (2013.01); *G06F 13/28* (2013.01); *G06F 17/30194* (2013.01); *G06F 17/30584* (2013.01)

(58) Field of Classification Search
None
See application file for complete search history.

(56) References Cited

U.S. PATENT DOCUMENTS 6,493,804 B1 * 12/2002 Soltis ................. G06F 12/0815
707/999.009
6,516,425 B1   2/2003 Belhadj
(Continued)

OTHER PUBLICATIONS

International Search Report and Written Opinion issued in International Application No. PCT/US2017/045091, dated Oct. 6, 2017, 16 pages.

(Continued)

*Primary Examiner* — Mano Padmanabhan
*Assistant Examiner* — Jean C Edouard
(74) *Attorney, Agent, or Firm* — Fish & Richardson P.C.

(57) ABSTRACT

Methods, systems, and apparatus for allocating, by a source of one or more sources, a segment of a data file of a transient memory for exclusive access by the source, the transient memory being a distributed in-memory file system that supports remote direct memory access; writing, by the source, data from an initial partition to one or more blocks within the allocated segment of the data file, wherein a portion of the initial partition is written to a first block of the one or more blocks; publishing, by the source, the segment of the data file of the transient memory to be accessible for reading by one or more sinks; and reading by a particular sink of the one or more sinks, a particular block of the published segment of the data file of the transient memory, wherein the particular block is associated with the particular sink.

20 Claims, 4 Drawing Sheets

(56) References Cited

U.S. PATENT DOCUMENTS

| | | | |
|---|---|---|---|
| 8,504,518 B1* | 8/2013 | Ghemawat | G06F 17/30174 707/610 |
| 8,677,091 B2 | 3/2014 | Littlefield | |
| 8,775,718 B2* | 7/2014 | Kanevsky | G06F 3/061 370/389 |
| 2002/0078132 A1 | 6/2002 | Cullen | |
| 2007/0192516 A1 | 8/2007 | Ibrahim et al. | |
| 2008/0147997 A1* | 6/2008 | Littlefield | G06F 17/302 711/161 |
| 2008/0307192 A1* | 12/2008 | Sinclair | G06F 12/0246 711/218 |
| 2010/0235831 A1* | 9/2010 | Dittmer | G06F 9/45558 718/1 |
| 2011/0066803 A1* | 3/2011 | Arakawa | G06F 11/1088 711/114 |
| 2011/0113207 A1* | 5/2011 | Fiske | G06F 17/30135 711/162 |
| 2011/0225453 A1* | 9/2011 | Spry | G06F 11/1092 714/15 |
| 2012/0131025 A1* | 5/2012 | Cheung | G06F 17/30082 707/755 |
| 2012/0131285 A1 | 5/2012 | Leshchiner et al. | |
| 2013/0132967 A1* | 5/2013 | Soundararajan | G06F 9/5066 718/104 |
| 2013/0262405 A1* | 10/2013 | Kadatch | G06F 9/5072 707/692 |
| 2014/0223096 A1* | 8/2014 | Zhe Yang | G06F 12/0871 711/114 |
| 2015/0161163 A1 | 6/2015 | Cypher et al. | |

OTHER PUBLICATIONS

'ignite.apache.org' [Online] "Apache ignite—In-Memory MapReduce," Jul. 10, 2016, [retrieved on Sep. 26, 2017] Retrieved from Internet: URL<https://web.archive.org/web/20160710023659/http://ignite.apache.org:80/features/mapreduce.html> 2 pages.

'gridgrain.com' [Online] "Introducing Apache Ignite White Paper—GridGain," Aug. 9, 2016, [retrieved on Sep. 26, 2017] Retrieved from Internet: URL<:https://web.archive.org/web/20160809102408/http://www.gridgain.com:80/resources/papers/introducing-apache-ignite>13 pages.

Search and Examination Report issued in British Application No. GB1712817.4, dated Feb. 12, 2018, 5 pages.

Written Opinion issued in International Application No. PCT/US2017/045091, dated Jun. 13, 2018, 8 pages.

* cited by examiner

REPARTITIONING DATA IN A DISTRIBUTED COMPUTING SYSTEM

CROSS-REFERENCE TO RELATED APPLICATION

This application is a continuation of U.S. application Ser. No. 15/235,511, filed Aug. 12, 2016, the contents of which are hereby incorporated by reference.

FIELD

The present specification generally relates to repartitioning data in a distributed computing system.

BACKGROUND

The present disclosure generally relates to large-scale analytical data processing. Such data processing has become widespread in web companies and across industries. Distributed data processing systems need a mechanism to reliably repartition data in order to perform operations such as distributed joins and aggregations.

SUMMARY

Accordingly, implementations of the present disclosure provide a new approach to distributed data repartitioning that takes advantage of single-sided communication (such as Remote Direct Memory Access (RDMA)) to both reduce job execution time and cost. Optimizing the data repartitioning, also known as the shuffle operation, significantly reduces data processing job execution time as well as job execution cost.

One innovative aspect of the subject matter described in this specification is embodied in systems and methods for repartitioning data in a distributed computing system. The distributed computing system includes one or more sources, each source comprising an initial partition of the data; one or more sinks, each sink comprising a final partition of the data; and a transient memory comprising a data file, the transient memory configured to transiently store data in-memory. In certain implementations, the transient memory is a distributed in-memory file system that supports remote direct memory access operations. The systems and methods for repartitioning data in a distributed computing system include allocating, by a source of the one or more sources, a segment of the data file of the transient memory for exclusive access by the source, and writing, by the source, data from the initial partition to one or more blocks within the allocated segment of the data file of the transient memory. A portion of the initial partition of the data is written to a first block of the one or more blocks within the allocated segment of the data file of the transient memory. The systems and methods for repartitioning data in a distributed computing system further include publishing, by the source, the segment of the data file of the transient memory to be accessible for reading by the one or more sinks, and reading, by a particular sink of the one or more sinks, a particular block of the published segment of the data file of the transient memory, the particular block being associated with the particular sink.

In certain implementations, the transient memory includes a marker file that includes metadata related to each segment in the data file, the metadata including information about segment length and segment commit status, and publishing, by the source, the segment of the data file to be accessible for reading by the one or more sinks includes updating the metadata. In certain implementations, the transient memory includes a counter used to coordinate writes to the data file and to exclusively allocate space in the data file to each source, and allocating, by a source of the one or more sources, a segment of the data file of the transient memory for exclusive access by the source includes updating the counter.

These and other implementations may each optionally include one or more of the following features. For instance, blocks in a published segment of the data file are flushed to a permanent memory, and reading, by a particular sink of the one or more sinks, a particular block of the published segment of the data file includes reading the particular block from the permanent memory. In certain implementations, the size of the data file in the transient memory is maintained to satisfy a predetermined threshold level, by flushing blocks in a published segment of the data file to the permanent memory, resizing, and trimming the data file in the transient memory. For instance, the flushing, resizing, and trimming occur at predetermined intervals of time. In certain implementations, a failure indicator is set for a particular segment, indicating a failure in writing data to the particular segment, based on metadata included in the marker file.

Other implementations of these aspects include corresponding systems, apparatus, and computer programs, configured to perform the actions of the methods, encoded on computer storage devices.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In a distributed data processing system, to repartition data, for example to perform operations such as distributed joins and aggregations, a shuffle operation is created and sources and sinks are identified to write data as a source and read data as a sink. Data is stored transiently in-memory, e.g., stored in a distributed in-memory file system that supports remote direct memory access operations, rather than solely in disk, and accessed in a distributed manner to achieve low-latency. In addition, single-sided communication primitives, such as Remote Direct Memory Access (RDMA), are employed, rather than two-sided message passing, such as transmission control protocol (TCP) or remote procedure call (RPC) communication, to allow low latency, improved scaling and lower the job execution cost. The particular architecture, data layout and protocol, described in more detail below, that is used to read and write on distributed memory servers is the mechanism that enables high performance in-memory data repartitioning. Further, according to certain implementations, disk may be used when there is not enough space to keep data in memory.

Accordingly, implementations of the present disclosure provide a new approach to distributed data repartitioning that takes advantage of single-sided communication, such as RDMA, to both reduce job execution time and cost. As described in more detail below, this new approach significantly reduces execution cost, reduces end-to-end latency, and improves scalability compared to previous approaches. For example, distributed in-memory storage provides low latency and high throughput access to data with no memory fragmentation and hence low memory cost. Furthermore, in-memory storage provides the advantage of fast random access of data whereas disk-based file systems typically achieve fast access only for sequential access patterns. In addition, the single-sided communication, e.g. through RDMA support, enables the system to read and write data to the distributed storage with no CPU usage on the storage side, making the resource cost very inexpensive to run the storage system.

Figure 1:
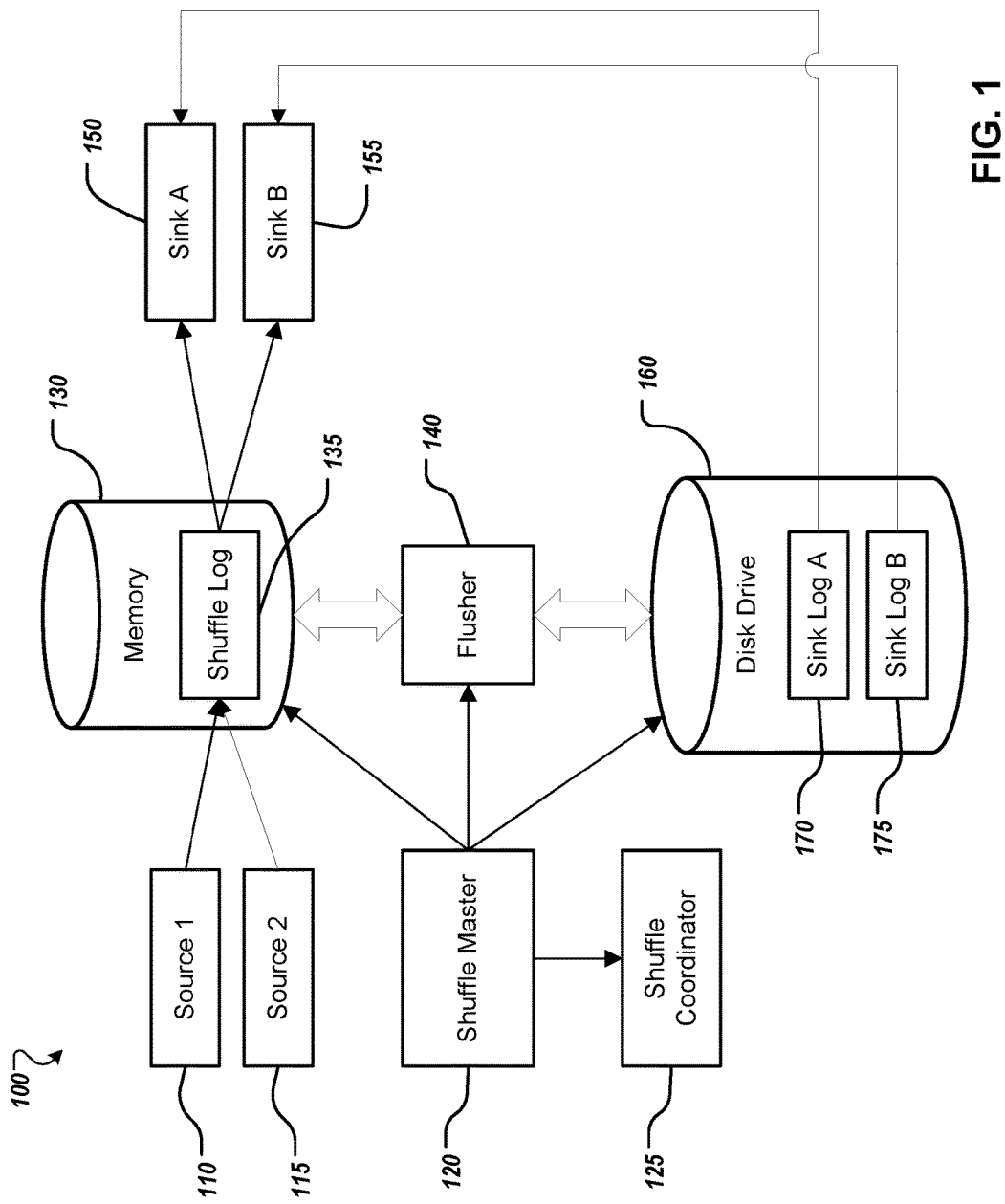
FIG. 1 depicts an example of a system for repartitioning data in a distributed computing system, according to implementations of the present disclosure.

FIG. 1 depicts an example of a system 100 for repartitioning data in a distributed computing system, according to implementations of the present disclosure. This shuffle infrastructure provides a reliable delivery mechanism for a set of virtual data sources to transmit data to a set of virtual data sinks. The system 100 may include sources 110, 115, sinks 150, 155, one or more shuffle masters 120, a shuffle coordinator 125, and one or more flushers 140. The system 100 may also include a memory-based distributed file system 130 and a disk-drive-based distributed file system 160. The sources 110, 115 are data producers and the sinks 150, 155 are data consumers. In certain implementations, a source 110, 115 may send data to any or all of the sinks 150, 155 within the same shuffle operation. In operation, data may flow from the sources 110, 115 to the memory-based distributed file system 130, and then to the sinks 150, 155. In certain implementations, in operation, data may flow from the sources 110, 115 to the memory-based distributed file system 130, and then to the disk-drive-based distributed file system 160 via the one or more flushers 140, and then to the sinks 150, 155.

The one or more shuffle masters 120 may manage space usage in the memory-based distributed file system 130 and the disk-drive-based distributed file system 160. In addition, the one or more shuffle masters 120 may control how data is migrated from the memory-based distributed file system 130 to the disk-drive-based distributed file system 160. In certain implementations, multiple shuffle masters 120 may run within a shuffle group, which may represent a job or query with dependent shuffle operations. The shuffle coordinator 125 may coordinate and track space usage in the memory-based distributed file system 130 and the disk-drive-based distributed file system 160, and may also provide a central control point for the shuffle. A shuffle group may be created before starting a shuffle operation. The shuffle group may support an operation in which all sources in the shuffle are marked as completed, which may be used to signal all sinks to process the data transferred so far and skip the rest of data transfer. Data included in a shuffle operation and which is to be transferred from a source to a sink is referred to as shuffled data. When the shuffled data is no longer needed, for example after the shuffled data is read by a sink, an operation may clean up any resources consumed and destroy the shuffle group.

A shuffle master 120 may be maintained for the shuffle operations and may track the progress and make memory available in the memory-based distributed file system 130 for the data being shuffled. Upon starting a shuffle operation, the shuffle master 120 may create a file called a shuffle log 135 in the memory-based distributed file system 130 for that shuffle operation. The shuffle log 135 in the memory-based distributed file system 130 may store data for all sinks but not necessarily all of the data produced by sources. For example, in certain implementations, the shuffle log 135 only contains the most recently shuffled data, while the rest of the produced data resides in sink log files 170, 175 of the disk-drive-based distributed file system 160. Unlike the shuffle log 135, there may be one sink log file for each sink—i.e., sink log A 170 associated with sink A 150 and sink log B 175 associated with sink B 155. In certain implementations, there may be an overlap between the shuffle log 135 of the memory-based distributed file system 130 and the sink log files 170, 175 of the disk-drive-based distributed file system 160.

Sources may conceptually have a number of ordered streams of data, one stream to each sink. Each stream of data may be defined by a sequence of requests for data that are associated with a given sink. As the sequence of requests is executed, the source may buffer data into per-sink blocks. When the source runs out of memory in its buffer, or when the shuffle ends, the source begins to append the content of its buffer to the shuffle log 135 of the memory-based distributed file system 130. The source may remove the block from the buffer as soon as the write to the memory-based distributed file system 130 finishes.

Sinks may receive a merged stream of data from all sources through a sequence of requests for data. The stream of data may be constructed by reading the shuffle log 135 of the memory-based distributed file system 130 and the sink log file of the disk-drive-based distributed file system 160 for the given sink. The constructed stream of data may be in no particular order, except that chunks received from a given source may be in the same order as produced by that source. Moreover, sinks created with identical parameters may receive identical streams of data.

At a high level, the memory-based distributed file system 130 is configured to store data in remote memory and fetch data from remote memory. In other words, the memory-based distributed file system 130 is configured for efficient reading and writing in remote memory and to search data from that remote memory. The memory-based distributed file system 130 may provide distributed access to memory, e.g., RAM of remote machines, rather than disk. A memory-based file system may also be called in-memory file system. Thus, the memory-based distributed file system 130 may allow for random access to different regions of memory, which is more efficient than disk access, such that producers or sources write to different regions of memory, and consumers or sinks read from those regions of memory directly.

As described above, sources may buffer chunks of data into blocks, and sources may allocate some portion of the memory-based distributed file system 130 for themselves, and then dump the buffer into that specific location that has been allocated in memory. The allocation may be coordinated among the different sources, such that some portion of the memory-based distributed file system 130 may be allocated for each source to write data, and each source may periodically flush the local data the source has collected, e.g., in a buffer, into the allocated portion of memory in the memory-based distributed file system 130. Readers or sinks may have access to metadata associated with the shuffle data, and the sinks may determine the location in the shuffle log 135 at which data relevant to the sink is stored for the sink to read, based on the metadata. The sinks may access and read respective chunks of data from different areas of memory at the determined locations, and may merge data that is relevant to the sink, for example, responsive to a query.

Figure 2:
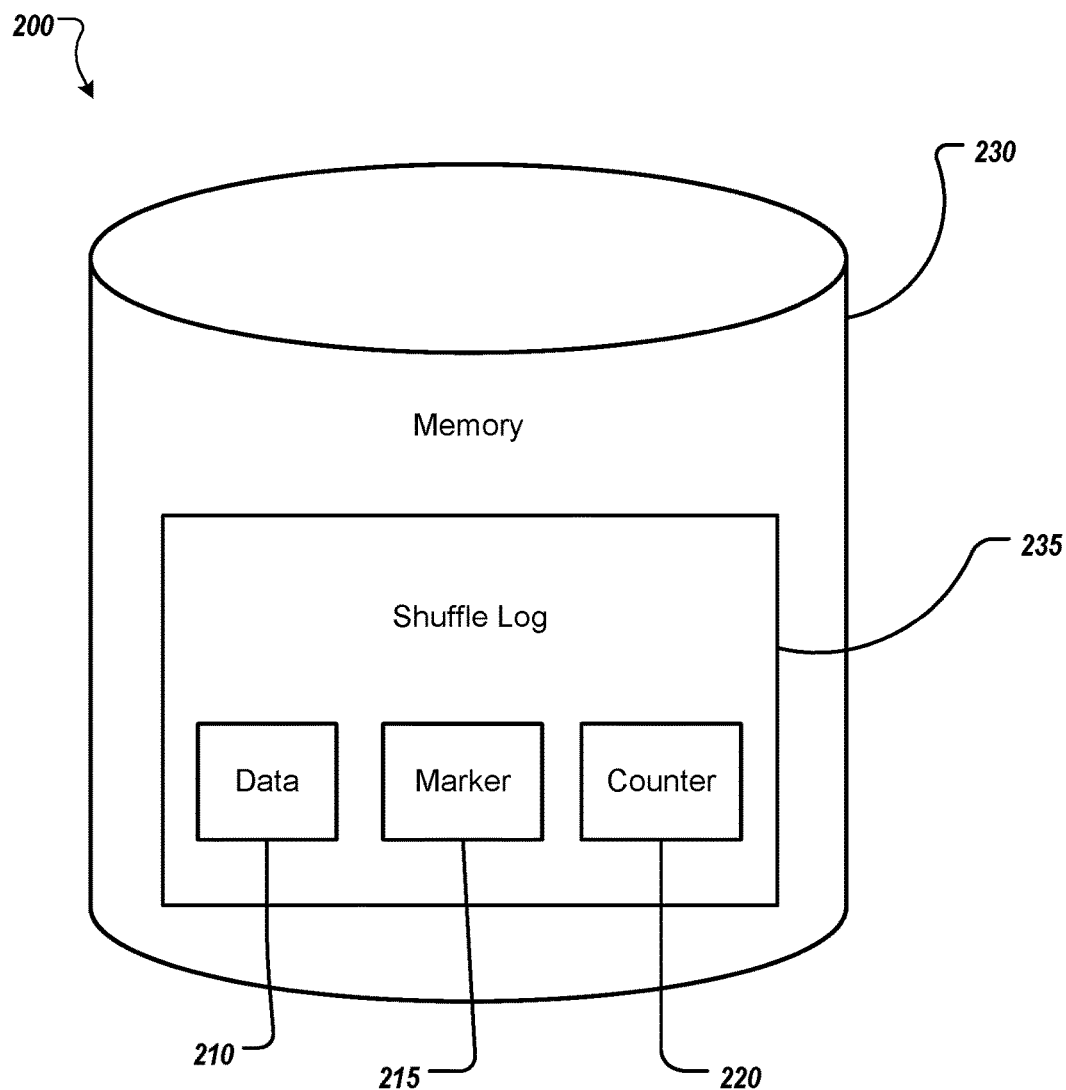
FIG. 2 depicts an example of the organization of data within a distributed file system in memory, according to implementations of the present disclosure.

FIG. 2 depicts an example of the organization of data within a distributed file system in memory 230, according to implementations of the present disclosure. For each shuffle operation, a shuffle log 235 may be created in the memory-based distributed file system 230, which transiently stores data, e.g., in a distributed in-memory file system that supports remote direct memory access operations, i.e., a transient memory. A shuffle log 235 may include a data file 210, a marker file 215, and an atomic counter file 220. The data file 210 may contain shuffle segments, which may be source buffer dumps, in which the buffer associated with a source transfers data from the buffer to the shuffle segment. The marker file 215 may contain metadata, such as segment length and commit status about each segment in the data file. The atomic counter file 220 may be used to coordinate writes to the data file 210 and the marker file 215 and exclusively allocate space in those files to writers or sources. Each source may transfer data in its buffer, which may contain data for one or more sinks, as a segment into the data file 210 of the shuffle log 235, every time the source buffer is full.

This architecture allows large writes, such that a segment may be written in a single write transaction and the segment may be as large as the source buffer, which may be, for example, 16 MB. This allows large stripe sizes, which may be, for example, 128 MB, and infrequent resizes of the data file 210.

Figure 3:
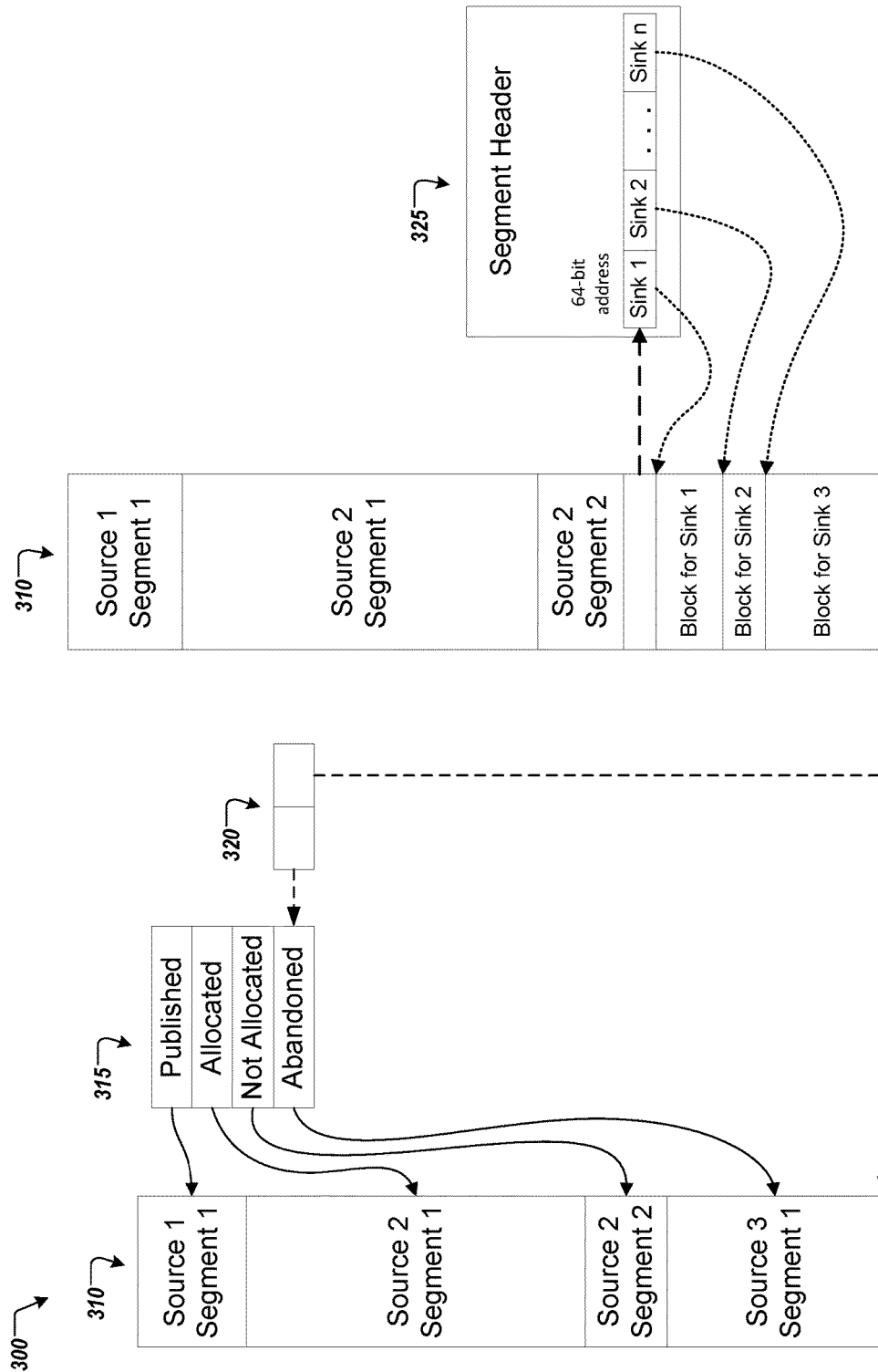
FIG. 3A depicts an example of a shuffle log in a distributed file system in memory, according to implementations of the present disclosure.
FIG. 3B depicts an example of a data file in a shuffle log of a distributed file system in memory, according to implementations of the present disclosure.

FIG. 3A depicts an example of a shuffle log 300 in a distributed file system in memory, according to implementations of the present disclosure. For every segment in the data file 310, there may be an entry in the marker file 315. That segment marker in the marker file 315 may contain the state of the segment, the start offset of the segment in the data file 310, or the length of the segment, or any combination thereof. The state of the segment may be indicated, for example, as one of allocated, not allocated, published, or abandoned. Allocated may mean, for example, the segment has been reserved; not allocated may mean, for example, the segment has not been reserved; published may mean, for example, that the segment is available for reading; and abandoned may mean, for example, an error has occurred and the segment is incomplete. Each segment marker in the marker file 315 may have a fixed size, which may be, for example 16 bytes. In addition, each segment marker in the marker file 315 may be in the same order as the segments, as depicted in FIG. 3A. Thus, for example, the first segment marker in the marker file 315 may correspond to the first segment in the data file 310; the second segment marker in the marker file 315 may correspond to the second segment in the data file 310; and so on, until the last segment marker in the marker file 315 which may correspond to the last segment in the data file 310. As depicted, for example, the first segment may correspond to a first segment from the first source; the second segment may correspond to a first segment from the second source; the third segment may correspond to a second segment from the second source; and the fourth segment may correspond to a first segment form the third source. As described above, there may be any number of sources and any number of segments may be associated with each source. The design of the shuffle log, which in particular includes the structure of marker file, and the layout and logical arrangement of data inside the data file, accounts for and exploits particular technical properties of the underlying memory-based distributed file system.

FIG. 3B depicts an example of a data file 310 in a shuffle log of a distributed file system in memory, according to implementations of the present disclosure. In the data file 310, each segment may include a header 325 and a block data portion. The segment header 325 may include an array of pointers to the individual blocks of data within that segment. For example, the segment header 325 may include, for example, a 64-bit address for each block. There may be one entry for every sink in the shuffle, even if the segment includes no data for that sink. The design of using one or more blocks per segment in the data file takes advantage of the technical property of the memory-based distributed file system related to low latency random read access and write access. Using one or more blocks per segment enables scaling the size of segments dynamically and efficiently managing the available storage in the memory-based distributed file system. This is especially advantageous in a case when the memory-based distributed file system is shared for processing multiple concurrent shuffle operations.

Referring to FIG. 3A, the counter file 320 may represent an atomic double counter that may keep track of the current segment index, and the next offset that may be allocated in the data file, i.e., the end offset of the data file. A write operation may start by increasing the counter. The counter incremented by the size of the segment, and may be rounded up to a multiple of substripe length, which may be, for example, 8 KB. A read operation may begin reading from a start offset and may read at most up to an end offset. If the end offset is not provided, the read operation may read the current counter value and may use the current counter value as the end offset. Concurrent raw reads may be made to the segment headers 325 of the segments that are being read, and then the offset values may be used to read the shuffle block from the segment.

As described above, a source produces output in chunks of data, and the source stores the chunks of data in a temporary buffer. When the source runs out of total memory allocated for its buffer, the source may select a portion or all of the buffer, format that data as a shuffle segment, and append the segment to the shuffle log 135 of the memory-based distributed file system 130. Within a shuffle segment, the chunks of data may be organized as blocks of data. Accordingly, the source never accesses the disk-drive-based distributed file system 160.

As described above, a sink may read all the data sent from the sources to that sink and may return that data, for example, to the user as shuffle chunks of data. There may be a deterministic order when a sink reads chunks of data, which may enable multiple runs of the same sink to return the same chunks in the same order. In that manner, the sink may be capable of subsequently acting as a source for another shuffle operation. Each sink may read the data relevant to the sink, in form of shuffle blocks, from the shuffle log 135 of the memory-based distributed file system 130 and from sink log files 170, 175 of the disk-drive-based distributed file system 160. Each sink then may send that data to a client receive queue, for example, to be consumed by a user. The sink may decode the received blocks and may convert the received blocks to chunks of data, and the sink may also deduplicate and remove chunks of data that are not received in the right order. A sink coordinator may maintain a current read offset in the shuffle log file 135 and may periodically check both the memory-based distributed file system 130 and the disk-drive-based distributed file system 160 for any new data. For example, with the sink coordinator, the sink may check the shuffle log 135 of the memory-based distributed file system 130 and read any new blocks of data, and if there is data in the sink log file 170, 175 of the disk-drive-based distributed file system 160 past the current read offset, the sink may read that data.

In operation, for example with the running of a query, the shuffle master 120 may serve as centralized process for each query, responsible for maintaining integrity of shuffle, creating the shuffle log file 135 upon the start of a shuffle and deleting the shuffle log file 135 when the shuffle ends. For example, the shuffle master 120 may monitor the shuffle log 135 to ensure there is enough space in the memory, and if source failures occur, the shuffle master may account for the failures to ensure that the shuffle runs without error. When a shuffle starts, the shuffle master 120 may create and resize the shuffle data and counter file simultaneously. The initial size of the data file may be determined, for example, based on the number of sinks in the shuffle.

When a source produces some data to write to the shuffle log 135 of the memory-based distributed file system 130, the counter file 220 may be incremented to indicate that a portion of the shuffle log 135 should be reserved or allocated for the source, which ensure there are no conflicts from other sources writing to the same location in memory. That process enables shared memory to be accessed by multiple sources, with each source reserving a unique location to write all data the source has collected to a particular area in the shuffle log 135, formatted in a way that is readable and accessible by the sinks, so that each sink can determine which part of the segment is relevant to the sink and read data from that particular location.

In certain implementations, the sinks may start running while the sources are running. As described above, the sinks may access the shuffle log 135, which includes the marker file 215 used to indicate the status of different segments in the data file 210 of the shuffle log 135. The sinks may periodically check the marker file 215 to determine which regions in the data file 210 are published, meaning the regions are available for reads. When a new region is detected as published, the sink may read the index portion of that segment to determine if any data in the segment is relevant to the sink. If there is data in the segment relevant to the sink, the offset of that data may be determined, and the sink may read that data.

In certain implementations, the shuffle may require transferring data far larger than the memory quota of the memory-based distributed file system 130 available to the system. To achieve that end, data stored in the memory-based distributed file system 130 may be periodically flushed, by one or more flushers 140, from the memory-based distributed file system 130 to the disk-drive-based distributed file system 160. Flushing involves reading a portion of the data in the memory-based distributed file system 130 and appending it to the sink log file on the disk-drive-based distributed file system 160. After that portion of data has been written to the disk-drive-based distributed file system 160, the file in the memory-based distributed file system 130 is trimmed to deallocate the used memory corresponding to that written portion of the data. To maximize the flush efficiency, larger flush requests may be triggered with less frequency. Thus, a flush operation may be triggered if, for example, the current usage is more than eighty percent of the current quota. Further, when a flush is triggered, the usage may be reduced, for example, to less than fifty percent of the current quota. When handling a flush request, the flusher 140 may process the specified data sequentially and may flush all data up to a specified end offset.

The shuffle coordinator 125 may manage the storage quotas for the memory-based distributed file system 130 and the disk-drive-based distributed file system 160. For example, the shuffle coordinator 125 may use a given total quota limit and may distribute the quota among active queries. The shuffle coordinator 125 may divide the total available resources between queries, accounting for query priority, users, and resource reservations. Because there may be more than one shuffle operation running within a query, the query quota may be distributed among all active shuffles within that query. In addition, the one or more shuffle masters 120 may allocate the shuffle quota among shuffle log files and maintain the size of the shuffle log files by periodically flushing, resizing and trimming each shuffle log file 135.

According to certain implementations, sources and sinks may be replicated and have multiple copies because processes might die or get orphaned, and to enable working around slow machines via task re-dispatching. In certain implementations, shuffles may be nested so that the system is able to feed a function of the output of a sink in one shuffle into a source in another shuffle. For example, nesting shuffles may be used for multiple levels of joins on different keys, requiring partitioning after each join. In certain implementations, the shuffle operation and architecture may enable data streaming so that a sink can receive the first chunk of data before the last chunk of data is sent. In other words, it is not a requirement for the sources to finish before the sinks can start to receive data. Thus, sources may be deterministically repeatable, so that a source produces the same results in the same order if it is executed multiple times. In certain implementations, the shuffle operation and architecture may be capable of handling a heterogeneous workload, including large shuffles, e.g., on the order of tens of terabytes to petabytes, and also smaller, low latency shuffles, e.g., where the latency is within an order of magnitude of sending a RPC. Further, in certain implementations, the shuffle operation and architecture may enable in-order deliver of sent data, such that two data chunks sent from a single source to the same sink will arrive in the same order as sent. However, this may not imply any ordering among data chunks sent by different sources or data chunks received by various sinks.

Figure 4:
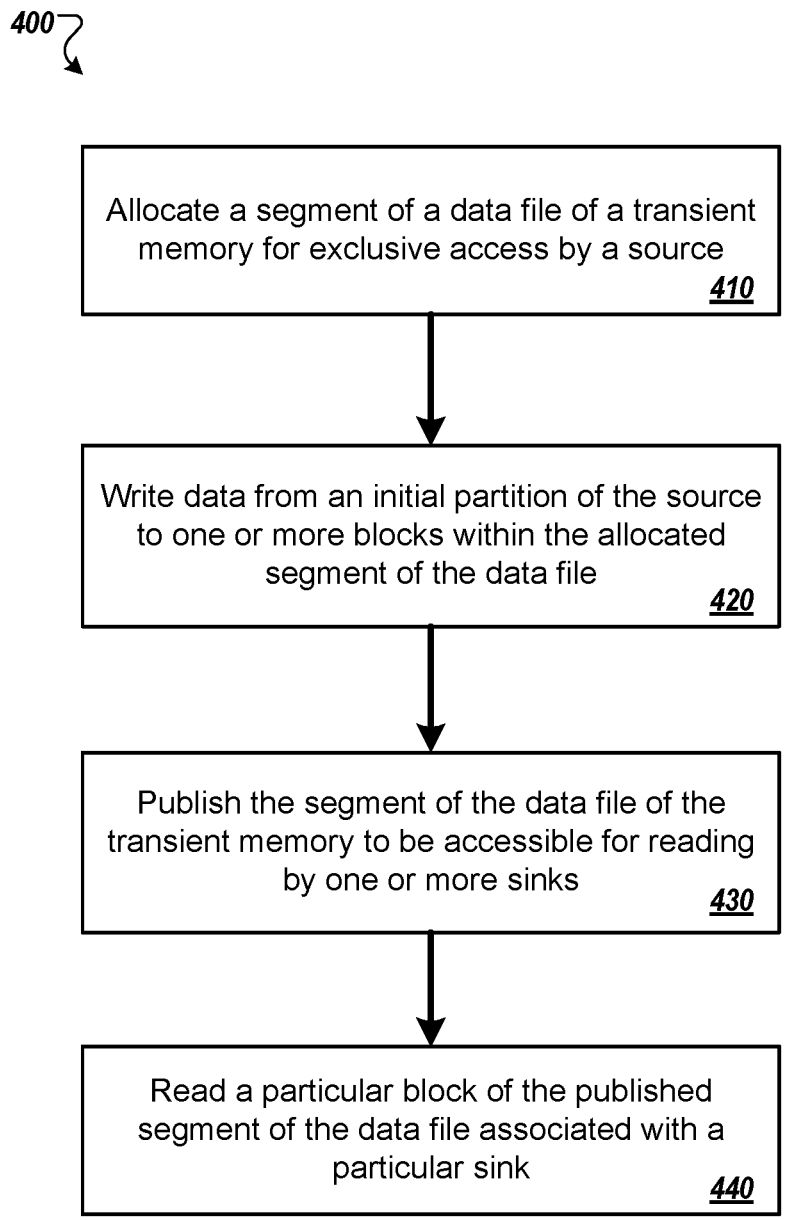
FIG. 4 depicts a flowchart of an example of a process for repartitioning data in a distributed computing system, according to implementations of the present disclosure.

FIG. 4 depicts a flowchart of an example of a process 400 for repartitioning data in a distributed computing system, according to implementations of the present disclosure. As described above, the distributed computing system may include one or more sources, one or more sinks, and a transient memory, which may be memory-based distributed file system 130. At 410, a source of the one or more sources may allocate a segment of a data file of the transient memory for exclusive access by the source. Once the segment of the data file is allocated to the source, the source may write data, at 420, from an initial partition of the source to one or more blocks within the allocated segment of the data file of the transient memory. A portion of the initial partition of the data may be written to a first block of the one or more blocks within the allocated segment of the data file of the transient memory.

At 430, the source may publish the segment of the data file of the transient memory to be accessible for reading by the one or more sinks of the distributed computing system. Once the segment of the data file is published as accessible for reading, a particular sink of the one or more sinks may read a particular block of the published segment of the data file of the transient memory at 440. The particular block of the published segment of the data file that the sink reads may be a particular block that is associated with the particular sink.

In accordance with process 400, the transient memory may be a distributed in-memory file system that supports remote direct memory access operations. In certain implementations, the transient memory includes a marker file that includes metadata related to each segment in the data file, the metadata including information about segment length and segment commit status, and the source publishing the segment of the data file to be accessible for reading by the one or more sinks, at 430, may include updating the metadata. In certain implementations, the transient memory may include a counter used to coordinate writes to the data file and to exclusively allocate space in the data file to each source, and a source of the one or more sources allocating a segment of the data file of the transient memory for exclusive access by the source, at 410, includes updating the counter.

In addition, blocks in a published segment of the data file may be flushed to a permanent memory, which may be the disk-drive-based distributed file system 160. At 440, a particular sink of the one or more sinks reading a particular block of the published segment of the data file may include reading the particular block from the permanent memory. In certain implementations, the size of the data file in the transient memory may be maintained to satisfy a predetermined threshold level, for example by flushing blocks in a published segment of the data file to the permanent memory, resizing, and trimming the data file in the transient memory. For example, the flushing, resizing, and trimming may occur at predetermined intervals of time. In certain implementations, a failure indicator may be set for a particular segment, indicating a failure in writing data to the particular segment, based on metadata included in the marker file 215.

Thus, implementations of the present disclosure achieve advantages such as a lower minimum latency, a lower overall CPU cost, using only the CPU resources that are currently required for the shuffle operation, and more effective use of memory with a low per-sink memory overhead. Further, advantages of implementations of the present disclosure include a memory-only shuffle path that provides an efficient failure recovery mechanism for data lost in memory through replication, and DMA primitives allow data transfer with no CPU cost on the memory hosts, resulting in the shuffle operation having very low CPU overhead outside of the sources and sinks. Accordingly, optimizing the distributed data repartitioning through the shuffle operation described in the present disclosure, significantly reduces execution cost, reduces end-to-end latency, and improves scalability compared to previous approaches.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, or in computer software, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
allocating, by a source of one or more sources that each comprise an initial partition of data to be repartitioned, a segment of a transient memory for exclusive access by the source;
writing, by the source, data from the initial partition to one or more blocks within the allocated segment of the transient memory, wherein a portion of the initial partition of the data is written to a first block of the one or more blocks within the allocated segment of the transient memory;
publishing, by the source, the segment of the transient memory to be accessible for reading by one or more sinks that each comprise a final partition of the data; and
reading, by a particular sink of the one or more sinks, a particular block of the published segment of the transient memory, wherein the particular block is associated with the particular sink.

2. The method of claim 1, wherein the transient memory is a distributed in-memory file system that supports remote direct memory access operations.

3. The method of claim 1, wherein the transient memory comprises a marker file that includes metadata related to each segment in the transient memory, wherein the metadata comprises information about segment length and segment commit status, and
wherein publishing, by the source, the segment of the transient memory to be accessible for reading by the one or more sinks comprises updating the metadata.

4. The method of claim 3, wherein a failure indicator is set for a particular segment, indicating a failure in writing data to the particular segment, based on metadata included in the marker file.

5. The method of claim 1,
wherein the transient memory comprises a counter used to coordinate writes to the transient memory and to exclusively allocate segments in the transient memory to each source, and
wherein allocating, by a source of the one or more sources, a segment of the transient memory of the transient memory for exclusive access by the source comprises updating the counter.

6. The method of claim 1,
wherein blocks in a published segment of the transient memory are flushed to a permanent memory,
wherein reading, by a particular sink of the one or more sinks, a particular block of the published segment of the transient memory comprises reading the particular block from the permanent memory.

7. The method of claim 6,
wherein the size of the transient memory is maintained to satisfy a predetermined threshold level, by flushing blocks in a published segment of the transient memory to the permanent memory, resizing, and trimming the transient memory,
wherein flushing, resizing, and trimming occur at predetermined intervals of time.

8. A system, comprising:
one or more processors; and
a memory storing instructions that are operable, when executed, to cause the one or more processors to perform operations comprising:
allocating, by a source of one or more sources that each comprise an initial partition of data to be repartitioned, a segment of a transient memory for exclusive access by the source;
writing, by the source, data from the initial partition to one or more blocks within the allocated segment of the transient memory, wherein a portion of the initial partition of the data is written to a first block of the one or more blocks within the allocated segment of the transient memory;
publishing, by the source, the segment of the transient memory to be accessible for reading by one or more sinks that each comprise a final partition of the data; and
reading, by a particular sink of the one or more sinks, a particular block of the published segment of the transient memory, wherein the particular block is associated with the particular sink.

9. The system of claim 8, wherein the transient memory is a distributed in-memory file system that supports remote direct memory access operations.

10. The system of claim 8, wherein the transient memory comprises a marker file that includes metadata related to each segment in the transient memory, wherein the metadata comprises information about segment length and segment commit status, and
wherein publishing, by the source, the segment of the transient memory to be accessible for reading by the one or more sinks comprises updating the metadata.

11. The system of claim 10, wherein a failure indicator is set for a particular segment, indicating a failure in writing data to the particular segment, based on metadata included in the marker file.

12. The system of claim 8,
wherein the transient memory comprises a counter used to coordinate writes to the transient memory and to exclusively allocate segments in the transient memory to each source, and
wherein allocating, by a source of the one or more sources, a segment of the transient memory of the transient memory for exclusive access by the source comprises updating the counter.

13. The system of claim 8,
wherein blocks in a published segment of the transient memory are flushed to a permanent memory,
wherein reading, by a particular sink of the one or more sinks, a particular block of the published segment of the transient memory comprises reading the particular block from the permanent memory.

14. The system of claim 13,
wherein the size of the transient memory is maintained to satisfy a predetermined threshold level, by flushing blocks in a published segment of the transient memory to the permanent memory, resizing, and trimming the transient memory,
wherein flushing, resizing, and trimming occur at predetermined intervals of time.

15. A non-transitory computer-readable medium storing software comprising instructions executable by one or more computers which, upon such execution, cause the one or more computers to perform operations comprising:
allocating, by a source of one or more sources that each comprise an initial partition of data to be repartitioned, a segment of a transient memory for exclusive access by the source;
writing, by the source, data from the initial partition to one or more blocks within the allocated segment of the transient memory, wherein a portion of the initial partition of the data is written to a first block of the one or more blocks within the allocated segment of the transient memory;

publishing, by the source, the segment of the transient memory to be accessible for reading by one or more sinks that each comprise a final partition of the data; and reading, by a particular sink of the one or more sinks, a particular block of the published segment of the transient memory, wherein the particular block is associated with the particular sink.

16. The medium of claim 15, wherein the transient memory is a distributed in-memory file system that supports remote direct memory access operations.

17. The medium of claim 15, wherein the transient memory comprises a marker file that includes metadata related to each segment in the transient memory, wherein the metadata comprises information about segment length and segment commit status, and wherein publishing, by the source, the segment of the transient memory to be accessible for reading by the one or more sinks comprises updating the metadata.

18. The medium of claim 17, wherein a failure indicator is set for a particular segment, indicating a failure in writing data to the particular segment, based on metadata included in the marker file.

19. The medium of claim 15, wherein the transient memory comprises a counter used to coordinate writes to the transient memory and to exclusively allocate segments in the transient memory to each source, and wherein allocating, by a source of the one or more sources, a segment of the transient memory of the transient memory for exclusive access by the source comprises updating the counter.

20. The medium of claim 15, wherein blocks in a published segment of the transient memory are flushed to a permanent memory, wherein reading, by a particular sink of the one or more sinks, a particular block of the published segment of the transient memory comprises reading the particular block from the permanent memory.

\* \* \* \* \*